(12) United States Patent
Showalter et al.

(10) Patent No.: US 6,230,577 B1
(45) Date of Patent: May 15, 2001

(54) ELECTRIC SHIFT CONTROL ASSEMBLY

(75) Inventors: Dan J. Showalter, Plymouth, MI (US); Carl Randall Vogt, Raleigh, NC (US); John S. Sewell, Muncie, IN (US); Paul G. Kowaleski, Clawson, MI (US); Rodney E. Barr, Cary; Michael Wayne Miller, Raleigh, both of NC (US); Thomas P. Knox, Dearborn, MI (US); Richard K. Rader, Laguna Hills, CA (US); Scott Wood, Westland, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/234,228

(22) Filed: Jan. 20, 1999

(51) Int. Cl.$^7$ .................................................. F16H 59/00
(52) U.S. Cl. ..................... 74/337.5; 74/365; 74/421 A; 475/298
(58) Field of Search ..................................... 475/269, 298, 475/346; 74/336.5, 337.5, 365, 372, 421 A, 107

(56) References Cited

U.S. PATENT DOCUMENTS

| | | | |
|---|---|---|---|
| 3,370,477 | * | 2/1968 | Lewis .................................... 74/337.5 |
| 4,854,413 | * | 8/1989 | Kameda et al. ....................... 180/247 |
| 5,092,188 | * | 3/1992 | Fujikawa et al. ...................... 74/335 |
| 5,150,637 | * | 9/1992 | Ninomiya et al. ..................... 74/335 |
| 5,609,219 | * | 3/1997 | Watson et al. ......................... 180/248 |
| 5,842,947 | * | 12/1998 | Weilant ................................. 475/323 |
| 5,867,092 | * | 2/1999 | Vogt ...................................... 340/456 |
| 5,878,624 | * | 3/1999 | Showalter et al. ................. 74/473.37 |
| 5,915,513 | * | 6/1999 | Isley et al. ............................. 192/35 |
| 5,984,821 | * | 11/1999 | Showalter ............................. 475/204 |

\* cited by examiner

Primary Examiner—Charles A Marmor
Assistant Examiner—Ha Ho
(74) Attorney, Agent, or Firm—Brinks Hofer Gilson & Lione; Greg Dziegielewski

(57) ABSTRACT

Shift control assembly for a power transmission device includes an electric drive motor and gear train having an output which is coupled to and bi-directionally rotates a shift rail. The shift rail includes a pair of spaced-apart cam followers. Freely rotatably receiving the shift rail and disposed thereon between the cam followers is a shift fork assembly. The shift fork assembly includes a body having a pair of spaced-apart helical cam surfaces engaged by the cam followers and a fork engaging a shift clutch collar. As the shift rail rotates bi-directionally, the shift fork assembly and clutch collar bi-directionally translate. A circular plate is disposed for rotation with the shift rail and includes an array of apertures. A plurality of sensors are disposed in adjacent, sensing relationship to the circular plate. As the circular plate and shift rail rotate, the sensors generate unique combinations of signals corresponding to a plurality of specific angular positions of the shift rail and translational positions of the shift fork.

20 Claims, 4 Drawing Sheets

ELECTRIC SHIFT CONTROL ASSEMBLY

BACKGROUND OF THE INVENTION

The invention relates generally to an electric shift control assembly for power transmission systems and more specifically to an electric shift control assembly for use in motor vehicle drive line components such as transfer cases and transmissions.

Shift assemblies, that is, devices which achieve selection of two or more gears or speed ranges in motor vehicle drive line components such as transmissions and transfer cases have evolved significantly over the years. Initially, such devices were exclusively manual, that is, actuated by the driver and comprised a plurality of parallel shift rails and forks which were selectively engaged and bi-directionally translated by an operator controlled shift lever.

With the advent of automatic transmissions, the shift lever became a mode selection device rather than a speed range selection device, the actual gear shifting occurring within the transmission, and generally without significant operator input.

Similarly, manual control of transfer case speed ranges has undergone an evolution from direct, manual control to selection by an electric, hydraulic or pneumatic operator controlled by direct driver input or a microprocessor. With direct, manual control, the shift mechanism may be similar to early transmission mechanisms including, for example, a single shift rail which may be moved bi-directionally to engage high gear, low gear and neutral. Numerous other mechanical arrangements are utilized to achieve high and low gear selection. For example, a shift fork may be slidably disposed on a fixed rail adjacent a rotatable shift rail. The rotatable shift rail is coupled to an energy storage device such as a spring which drives a cam engaged by a follower on the shift fork. The energy storage device stores energy so that shifts that cannot be immediately completed due to gear clash will be completed upon engageable alignment of gear teeth. Other assemblies utilizing, for example, rotating sector plates or ball screw actuators provide bi-directional motion to achieve such gear and speed selection.

When integrated with a microprocessor or other control system, it is commonly necessary to sense, in real time, the position of the shift member. Given such complex systems, it is generally advisable to detect such shift member position as proximate as possible to the actual components, i.e., the gears, achieving the shift. That is, if the assembly includes an energy storage device, it will be understood that the driving components of the mechanism may be in a position distinct from the driven components. Attempting to sense the position of the driven components from the drive components may thus readily introduce positional error. However, installing position sensors sufficiently proximate the driven or controlled element, i.e., the gears, may create significant packaging problems. Thus, gear shift operator assemblies wherein driving and driven components can be assured of always taking corresponding positions and thus permitting the position sensing to occur near the driving mechanism rather than the driven mechanism simplifies packaging and assembly issues. The present invention is directed to such an improved configuration.

SUMMARY OF THE INVENTION

A shift control assembly for a power transmission device includes an electric drive motor and gear train having an output which is coupled to and bi-directionally rotates a shift rail. The shift rail includes a pair of spaced-apart cam followers. Freely rotatably receiving the shift rail and disposed thereon between the cam followers is a shift fork assembly. The shift fork assembly includes a body having a pair of spaced-apart helical cam surfaces engaged by the cam followers and a fork engaging a shift clutch collar. As the shift rail rotates bi-directionally, the shift fork assembly and clutch collar bi-directionally translate. A circular plate is disposed for rotation with the shift rail and includes an array of apertures. A plurality of sensors are disposed in adjacent, sensing relationship to the circular plate. As the circular plate and shift rail rotate, the sensors generate unique combinations of signals corresponding to a plurality of specific angular positions of the shift rail and translational positions of the shift fork.

Thus it is an object of the present invention to provide an electric shift control assembly for a power transmission device such as a motor vehicle transmission or transfer case.

It is a further object of the present invention to provide an electric shift control assembly having a bi-directionally rotating shift rail which engages a cam and shift fork slidably disposed thereon.

It is a still further object of the present invention to provide an electric shift control assembly having an apertured plate secured to said rotating shift rail and a plurality of sensors disposed adjacent the apertured plate.

It is a still further object of the present invention to provide an electric shift control assembly having an electric motor and a speed reducing gear train having a bi-directionally rotating output coupled to a rotating shift rail.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
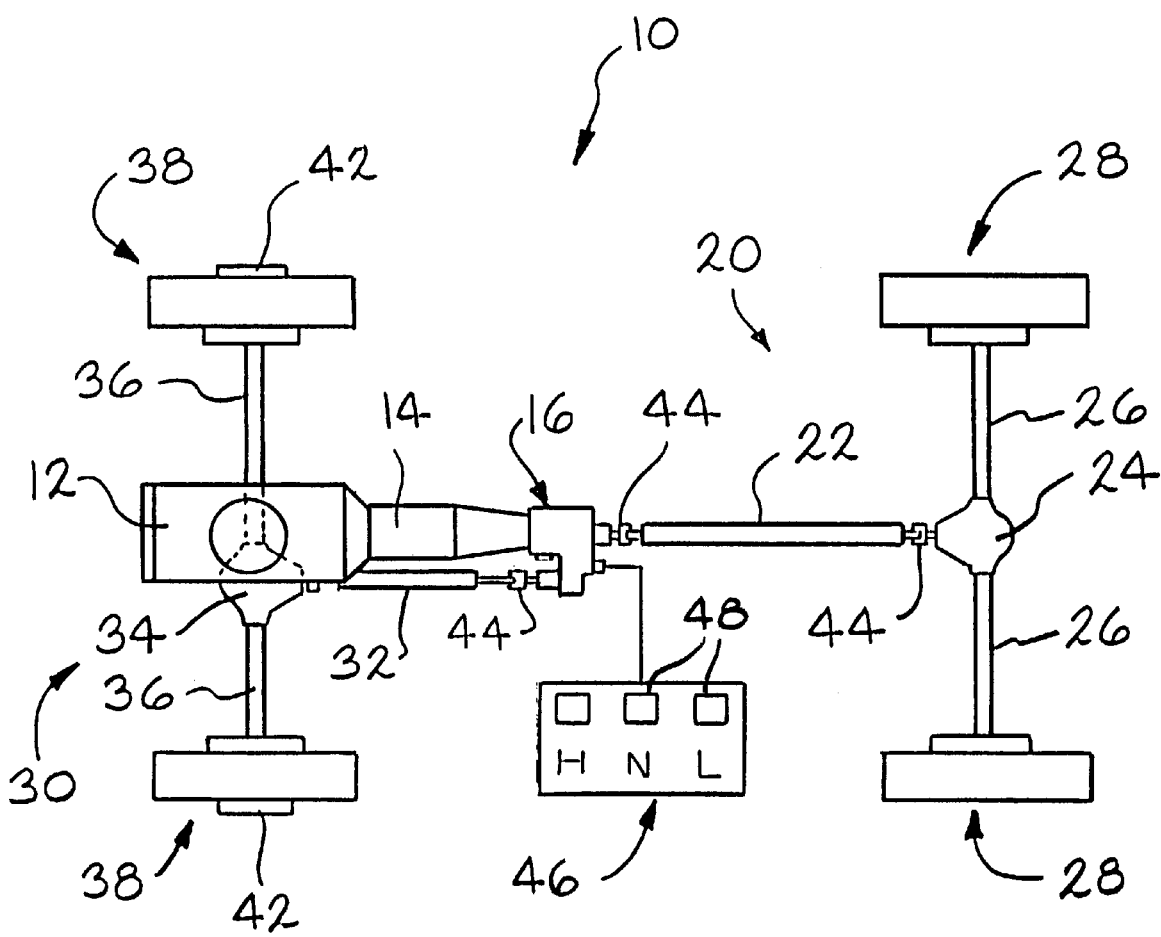
FIG. 1 is a diagrammatic, plan view of a four-wheel drive motor vehicle having a transfer case incorporating a shift control assembly according to the present inventions.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components. A control console 46 which is preferably disposed within convenient reach of the vehicle operator includes a switch or a-plurality of individual switches or push buttons 48 which facilitate selection of the operating mode of the transfer case assembly 16 as will be further described below.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
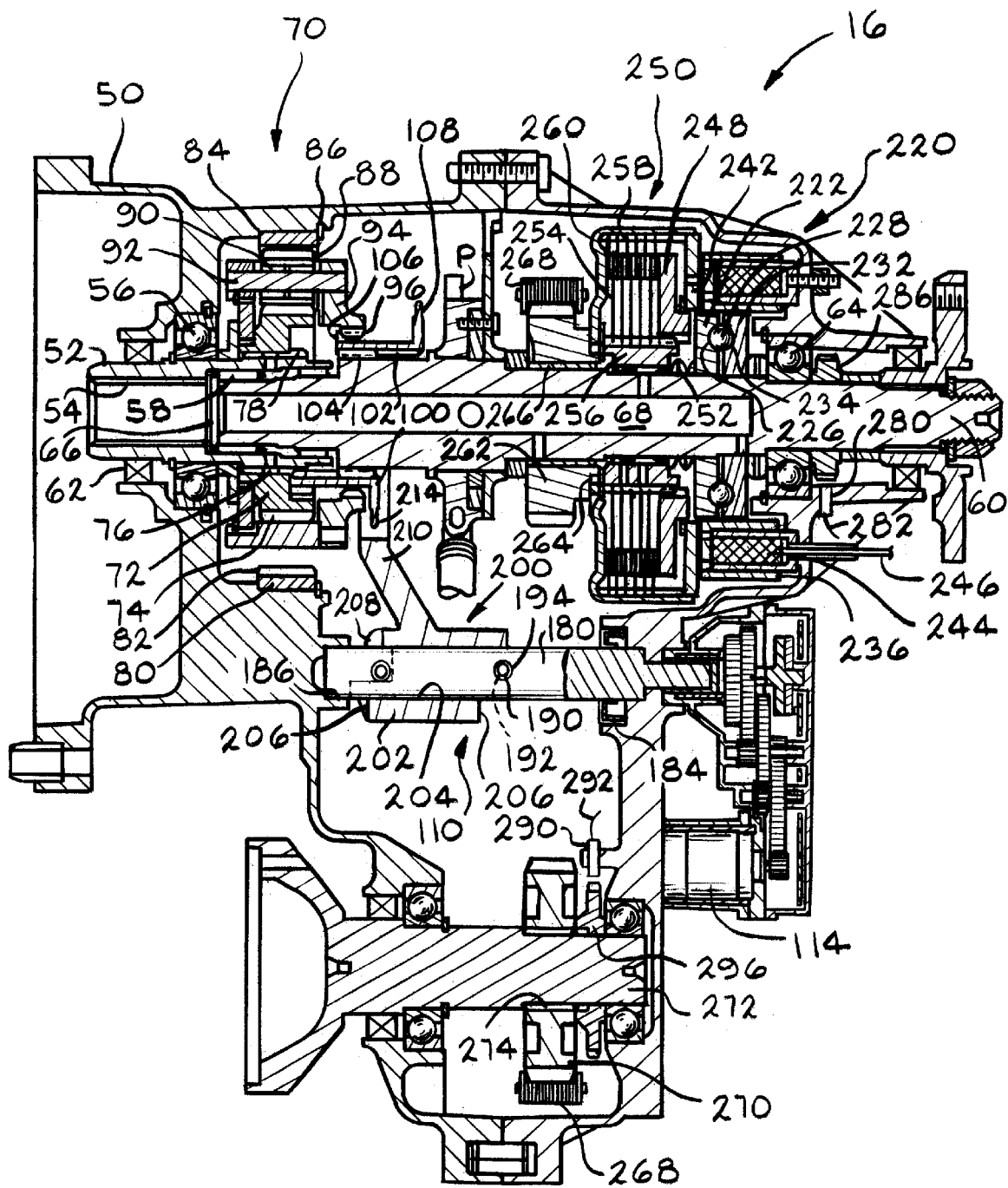
FIG. 2 is full, sectional view of a transfer case incorporating a shift control assembly according to the present invention.

Referring now to FIGS. 1 and 2, the transfer case assembly 16 incorporating the present invention includes a multiple piece, typically cast, housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 illustrated in FIG. 1 to the input shaft 52. The input shaft 52 is rotatably supported externally by an anti-friction bearing such as the ball bearing assembly 56 and internally by an anti-friction bearing such as the roller bearing assembly 58. The roller bearing assembly 58 is disposed upon a reduced diameter portion of an output shaft 60. An oil seal 62, positioned between the input shaft 52 and the housing assembly 50, provides an appropriate fluid tight seal therebetween. The opposite end of the output shaft 60 is supported by an anti-friction bearing such as a ball bearing assembly 64. An end cap or seal 66 closes off the end of an axial passageway 68 in the output shaft 60. A gerotor pump P will typically be utilized to provide a flow of lubricating and cooling fluid to the axial passageway 68 which is thence distributed through a plurality of radial ports in the output shaft 60 to the components of the transfer case assembly 16.

The transfer case assembly 16 also includes a two-speed planetary (epicyclic) gear assembly 70 disposed generally about the input shaft 52. The planetary gear assembly 70 includes a sun gear collar 72 having a plurality of external gear teeth 74 and a plurality of internal splines or gear teeth 76. The internal splines or gear teeth 76 are engaged by complementary external splines or gear teeth 78 formed on the input shaft 52. Radially aligned with the sun gear 72 and its teeth 74 is a ring gear 80 having internal gear teeth 82. The ring gear 80 is fixedly retained within the housing assembly 50 by any suitable retaining structure such as a projection or lip 84 formed in the housing assembly 50 and a cooperating snap ring 86. A plurality of pinion gears 88 are rotatably received upon a like plurality of anti-friction bearings such as roller bearings 90 which, in turn, are supported and located by a like plurality of stub shafts 92. The plurality of stub shafts 92 are mounted within and secured to a planet carrier 94. The planet carrier 94 includes a plurality of internal splines or gear teeth 96. The planetary gear assembly 70 is more fully described in co-owned U.S. Pat. No. 4,440,042 which is herein incorporated by reference.

The planetary gear assembly 70 also includes a dog clutch or clutch collar 100 defining elongate internal splines or gear teeth 102. The internal splines or gear teeth 102 of the clutch collar 100 are slidably received upon a complementary plurality of external splines or gear teeth 104 on the output shaft 60. The clutch collar 100 thus rotates with the output shaft 60 but may translate bi-directionally therealong. The clutch collar 100 also includes external splines or gear teeth 106 on one end which are in all respects complementary to the internal splines or gear teeth 96 on the planet carrier 94. The end of the clutch collar 100 opposite the gear teeth 96 defines a circumferentially and radially extending flange 108.

The clutch collar 100 is capable of three positions and operational modes. In the lower portion of FIG. 2, the clutch collar 100 is illustrated in its leftmost or direct drive position. Direct drive is achieved when the internal splines or gear teeth 102 of the clutch collar 100 engage the external splines or gear teeth 78 on the input shaft 52 thereby directly coupling the input shaft 52 to the output shaft 60 and providing direct or high gear drive therebetween.

When the clutch collar 100 is moved to the right from the position illustrated in the lower portion of FIG. 2, to the position illustrated in the upper portion of FIG. 2, the speed reduction achieved by the planetary gear assembly 70 is engaged through engagement of the external splines or gear teeth 106 on the clutch collar 100 with the internal splines or gear teeth 96 on the planet carrier 94. So engaged, the planetary gear assembly 70 is active and provides a speed reduction, typically in the range of from 3:1 to 4:1 between the input shaft 52 and the output shaft 60. Between these two positions is a neutral position. In the center, neutral position both the input shaft 52 and the planet carrier 94 are disconnected from the output shaft 60 and no power is transmitted therebetween.

Figure 3:
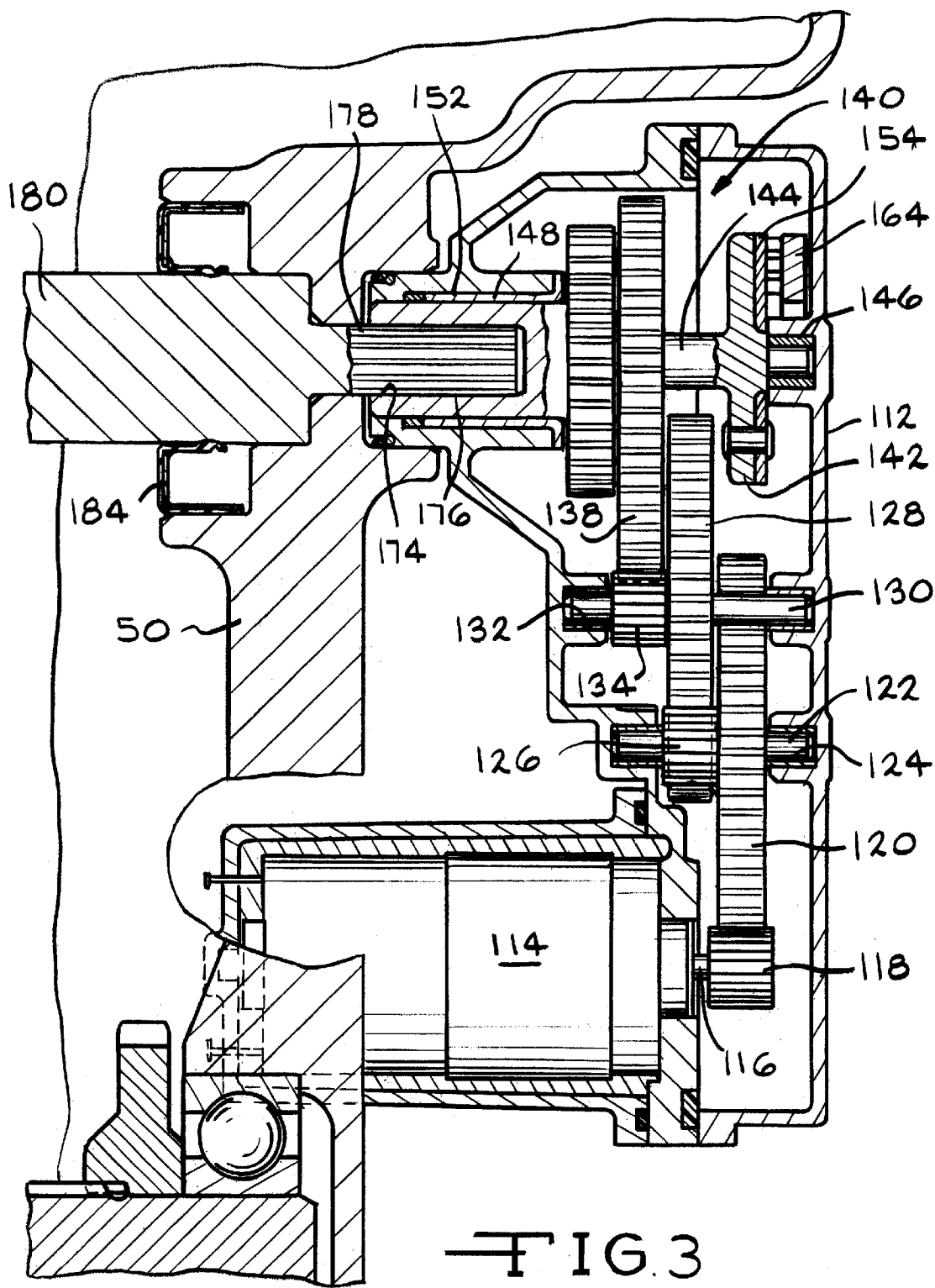
FIG. 3 is an enlarged, fragmentary, sectional view of a shift control drive assembly according to the present invention.

Referring now to FIGS. 2 and 3, the position of the clutch collar 100 is commanded by an electric shift control assembly 110. The shift control assembly 110 includes an auxiliary, preferably plastic housing 112. The auxiliary housing 112 includes various openings and counterbores which receive components of the electric shift control assembly 110 and protects such components as well. Secured to the auxiliary housing 112 is an electric drive motor 114 having an output shaft 116 coupled to a drive pinion 118. The drive pinion 118 is in constant mesh with the teeth of a first spur gear 120 which is received upon a stub shaft 122 which seats within suitably disposed counterbores 124 formed in the auxiliary housing 112, as noted above. The first spur gear 120 is coupled to or integrally formed with a second pinion gear 126 which effects a second speed reduction with a second spur gear 128. Similarly, the second spur gear 128 is secured to a stub shaft 130 which is received within suitable aligned counterbores 132 formed in the auxiliary housing 112. A third pinion gear 134 is integrally formed with or secured to the second spur gear 128 and effects a third speed reduction as it drives a third spur gear 138. The third spur gear 138 is fixedly secured to an output shaft assembly 140 and rotates therewith. The output shaft assembly 140 includes a circular disc or plate 142 secured to or integrally formed with an output shaft 144 received within a counterbore 146 and a sleeve 148 in a large through passageway 152.

Figure 5:
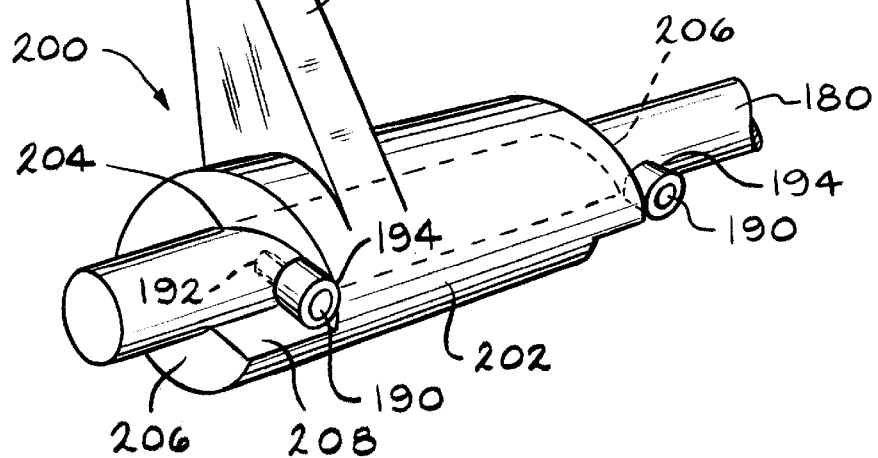
FIG. 5 is an enlarged, side elevational view of a position encoding device of a shift control assembly according to the present invention.
Figure 5:
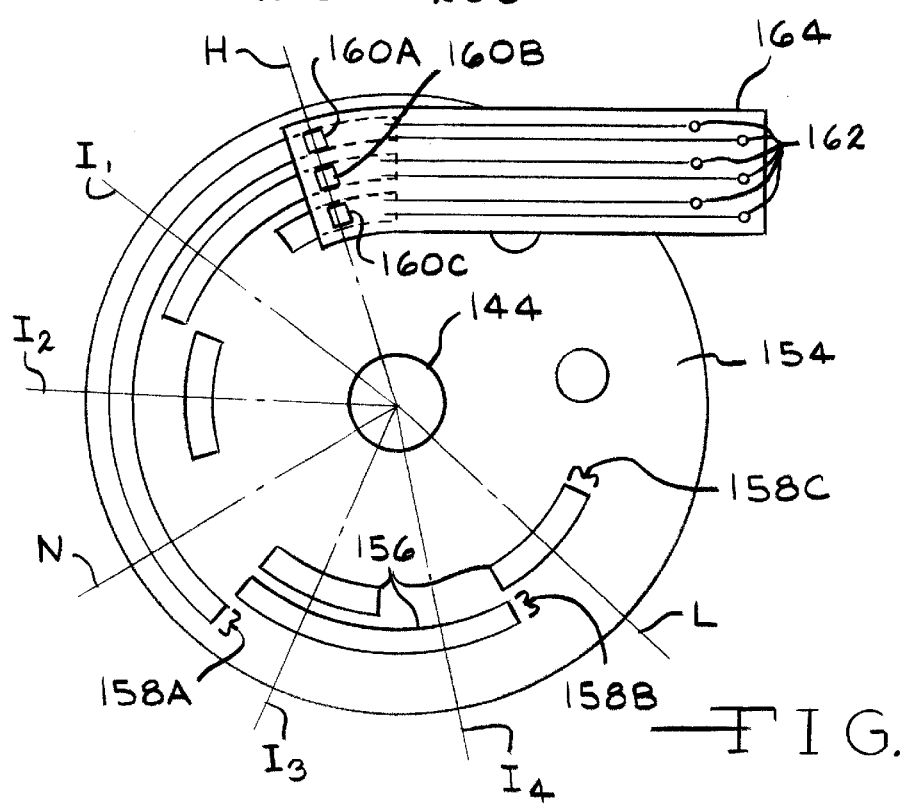

Referring now to FIGS. 3 and 5, secured to the circular plate 142 by any suitable means such as rivets is a flat, apertured plate or disc 154 having an array of curved apertures 156 disposed in tracks 158A, 158B and 158C in a configuration which is analogous to and generates Gray code data as the circular plate 142 rotates past a plurality of non-contact sensors 160A, 160B and 160C. Preferably, the apertured disc 154 is ferrous and has magnetic characteristics to interact with the preferred Hall effect sensors 160A, 160B and 160C described below. However, it may be made of other materials which appropriately interact with the specific type of sensors 160A, 160B and 160C utilized. Each of the sensors 160A, 160B and 160C aligns with one of the tracks 158A, 158B and 158C of the apertures 156 in the circular plate 154. The sensors 160A, 160B and 160C are preferably Hall effect sensors although other types of sensors such as optical or variable reluctance sensors may be utilized.

As is apparent from FIG. 5, and the following Truth Table, Table I, incremental rotation of the circular plate 154 provides a plurality of unique combinations of signals from the sensors 160A, 160B, and 160C which then uniquely describe the position of the circular plate to an associated microprocessor (not illustrated). In the following Table I, H represents high gear, N represents neutral, L represents low gear and $I_1$ through $I_4$ represent intermediate positions between the three desired selectable operating positions and modes.

TABLE I

| SENSOR | Position | | | | | | |
|---|---|---|---|---|---|---|---|
| | H | $I_1$ | $I_2$ | N | $I_3$ | $I_4$ | L |
| 160A | 1 | 1 | 1 | 1 | 0 | 0 | 0 |
| 160B | 1 | 1 | 0 | 0 | 1 | 1 | 0 |
| 160C | 1 | 0 | 1 | 0 | 1 | 0 | 1 |

Depending upon the definition necessary, that is, how many unique detected and coded positions of the circular plate 154 are necessary as well as the logic and operating capabilities of the microprocessor and its software, a circular plate 154 having two tracks and two sensors or four tracks and four sensors may also be utilized. The outputs of the sensors 160A, 160B and 160C are provided to output terminals 162 on a circuit board or similar insulating mounting 164 and thence to suitable electrical wires or conductors (not illustrated).

The output shaft 144 also defines a counterbore 174 having female or internal splines 176 which receive complementarily configured male or external splines 178 on a rotatable shift rail 180. An oil seal 184 provides a suitable fluid-tight seal between the shift rail 180 and the housing assembly 50.

Figure 4:
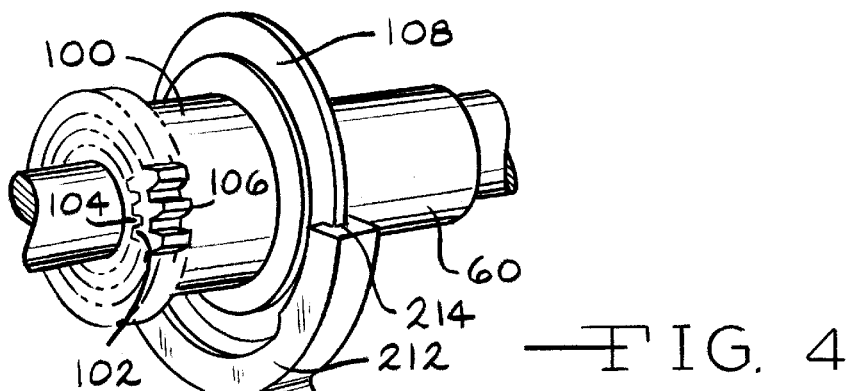
FIG. 4 is an enlarged, fragmentary, perspective view of a shift fork assembly according to the present invention.

Referring now to FIGS. 2 and 4, the rotatable shift rail 180 extends across the housing assembly 50 and its opposite end is seated within a suitable counterbore 186 formed in the housing assembly 50. A pair of spaced-apart radially disposed stanchions or stub shafts 190 are securely seated within radial passageways 192 in the shift rail 180. The stub shafts 190 include enlarged heads which retain freely rotatable cam followers or rollers 194 thereon. Disposed between the spaced-apart stanchions or stub shafts 190 and the rollers 194 is a shift fork assembly 200. The shift fork assembly 200 includes a body 202 having a through passageway 204 which is sized to just freely rotatably receive the shift rail 180. At each end of the shift fork body 202 is a helical cam 206. Preferably, the angle of the helical cams 206 is chosen to balance the forces that result from the drag of the automatic transmission 14 in neutral. The helical cams 206 are correspondingly disposed such that the axial distance from corresponding points on their surfaces is just slightly less than the distance between the inside surfaces of the rollers 194. An axially extending face or shoulder 208 which represents a discontinuity in the helical cams 206 acts as a positive stop in one direction of rotation as it engages one of the rollers 196.

The shift fork assembly 200 also includes an obliquely extending web 210 which terminates in a shift yoke 212 having ears which define a discontinuous, semi-circular channel or groove 214. The semi-circular channel or groove 214 receives and engages the flange 108 of the clutch collar 100. Such engagement inhibits rotation of the shift fork assembly 200. Accordingly, as the shift rail 180 and the cam followers or rollers 194 rotate, the shift fork assembly 200 and specifically the yoke 212 and clutch collar 100 translate axially and bi-directionally. Such translation of the yoke 212 effects selective engagement of the clutch collar 100 and selection of high gear, neutral or low gear as previously explained.

Referring again to FIG. 2, the transfer case assembly 16 also includes an electromagnetically actuated disc pack type clutch assembly 220. The clutch assembly 220 is disposed about the output shaft 60 and includes a circular drive member 222 coupled to the output shaft 60 through, for example, a splined interconnection. The circular drive member 222 includes a plurality of circumferentially spaced-apart recesses 226 in the shape of an oblique section of a helical torus. Each of the recesses 226 receives one of a like plurality of load transferring balls 228.

A circular driven member 232 is disposed adjacent the circular drive member 222 and includes a like plurality of opposed recesses 234 defining the same shape as the recesses 226. The oblique side walls of the recesses 226 and 234 function as ramps or cams and cooperate with the balls 228 to drive the circular members 222 and 232 apart in response to relative rotation therebetween. It will be appreciated that the recesses 226 and 234 and the load transferring balls 228 may be replaced with other analogous mechanical elements which cause axial displacement of the circular members 222 and 232 in response to relative rotation therebetween. For example, tapered rollers disposed in complementarily configured conical helices may be utilized.

The circular driven member 232 extends radially outwardly and is secured to a soft iron rotor 236. An armature 242 is disposed adjacent the face of the rotor 236. The rotor 236 surrounds an electromagnetic coil 244 on three sides.

The electromagnetic coil 244 is provided with electrical energy preferably from a pulse width modulation (PWM) control through an electrical conductor 246. The pulse width modulation scheme increases or decreases the average current to the electromagnetic coil 244 of the electromagnetic clutch assembly 220 and thus torque throughput of the disc pack type clutch assembly 220, as will be more fully described below, by increasing or decreasing the on time (duty cycle) of a drive signal. It will be appreciated that other modulating control techniques may be utilized to achieve engagement and disengagement of the electromagnetic disc pack type clutch assembly 220.

Providing electrical energy to the electromagnetic coil 244 causes magnetic attraction of the armature 242 with the rotor 236. This magnetic attraction results in frictional contact of the armature 242 to the rotor 236. When the output shaft 60 is turning at a different speed than the armature 242 this frictional contact results in a frictional torque being transferred from the output shaft 60, through the circular drive member 222, through the load transferring balls 228 and to the circular driven member 232. The resulting frictional torque causes the balls 228 to ride up the ramps of the recesses 226 and 234, causing axial displacement of the circular drive member 222. Axial displacement of the circular drive member 222 translates an apply plate 248 axially toward a disc pack clutch assembly 250. A compression spring 252 which may comprise a stack of Belleville washers provides a restoring force which biases the circular drive member 222 toward the circular driven member 232 and returns the load transferring balls 228 to center positions in the circular recesses 226 and 234 to provide maximum clearance and minimum friction between the components of the electromagnetic clutch assembly 220 when it is deactivated. An important design consideration of the recesses 226 and 234 and the balls 228 is that the geometry of their design and the design of the compression spring 252 and the clearances in the disc pack assembly 250 ensure that the electromagnetic clutch assembly 220 is not self-locking. The electromagnetic clutch assembly 220 must not self-engage but rather must be capable of controlled, proportional engagement and torque transfer in direct response to the modulating control input.

The disc pack clutch assembly 250 includes a first plurality of smaller friction plates or discs 254. The first plurality of discs 254 are coupled by interengaging splines to a clutch hub 256 which is coupled to the output shaft 60 for rotation therewith. A second plurality of larger friction plates or discs 258 are coupled to an annular housing 260 by interengaging splines for rotation therewith and are interleaved with the first plurality of friction discs 254.

The annular housing 260 is disposed concentrically about the output shaft 60 and is coupled to a chain drive sprocket 262 by a plurality of interengaging splines or lugs and recesses 264. The chain drive sprocket 262 is freely rotatably disposed on the output shaft 60 and is supported by a journal or needle bearing assembly 266. When the clutch assembly 220 is engaged, it transfers energy from the output shaft 60 to the chain drive sprocket 262. A drive chain 268 is received upon the chain drive sprocket 262 and engages and transfers rotational energy to a driven chain sprocket 270. The driven chain sprocket 270 is coupled to a front (secondary) output shaft 272 of the transfer case assembly 16 by interengaging splines 274.

The transfer case assembly 16 also includes a first Hall effect sensor 280 having an output line 282 which is disposed in proximate, sensing relationship with a plurality of teeth on a first tone wheel 286 which is coupled to and rotates with the rear (primary) output shaft 60. A second Hall effect sensor 290 has an output line 292 and is disposed in proximate, sensing relationship with a plurality of teeth on a second tone wheel 296 disposed adjacent the driven sprocket 270 on the front output shaft 272. Preferably, the number of teeth on the first tone wheel 286 is identical to the number of teeth on the second tone wheel 296 so that identical shaft speeds result in the same number of pulses per unit time from the Hall effect sensors 280 and 290. This simplifies computations relating to shaft speeds and improves the accuracy of all logic decisions based on such data and computations. As to the actual number of teeth on the first tone wheel 286 and teeth on the second tone wheel 296, it may vary from thirty to forty teeth or more or fewer depending upon rotational speeds and sensor construction.

The first and second Hall effect sensors 280 and 290 sense the respective adjacent teeth and provide a series of pulses in the lines 282 and 292, respectively, which may be utilized to compute the instantaneous rotational speeds of the rear output shaft 60 and the front output shaft 272 which, of course, correspond to the rotational speeds and the rear drive shaft 22 and the front drive shaft 32, respectively.

The transfer case assembly 16 incorporating an electric shift control assembly 110 according to the present invention provides improved operational control and positioning of a clutch collar such as the clutch collar 100 and indication of the position of such clutch collar 100. Such improved operation is the result of several features of this assembly. First of all, securing the flat, apertured plate or disc 154 so that it rotates with, and is therefore always representative of the position of the shift rail 180 and thus of the shift fork assembly 200, ensures that any controller or microprocessor receives accurate information regarding the position of these components. The non-contact Hall effect sensors 160A, 160B and 160C provide both high definition of the position of the shift fork assembly 200 as well as improved reliability.

Since gear clash may be encountered when engagement of the clutch collar 100 is attempted and since the electric drive motor 114 effectively directly drives the clutch collar 100, i.e., there is no resilient coupling or energy storing device in the assembly 110, it is anticipated that shifts that cannot be fully completed due to gear clash will be detected by the sensors 160A, 160B and 160C and that such shift command may temporarily withdrawn and then repeated by the software of an associated controller or microprocessor. Such shift repetition, shift sequencing or shift prohibitions may also be achieved through appropriate associated software.

The foregoing disclosure is the best mode devised by the inventors for practicing this invention. It is apparent, however, that apparatus incorporating modifications and variations will be obvious to one skilled in the art of shift control mechanisms. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A shift control assembly for a power transmission device having at least two distinct speed ranges comprising, in combination, a bi-directionally rotating shift rail having a pair of spaced apart cam followers, a shift fork adapted to translate a shift component between at least two positions corresponding to such speed ranges, said shift fork including an aperture for receiving said shift rail and a pair of cam surfaces, each of said cam surfaces engaged by a respective one of said pair of cam followers, a circular plate disposed for rotation with said shift rail, said circular plate defining a plurality of spaced-apart apertures, a plurality of sensors disposed in sensing relationship adjacent said circular plate, an electric drive motor having an output, and a gear train directly coupling said output of said drive motor and said shift rail, whereby rotational movement of said electric drive motor correspondingly translates said shift fork.

2. The shift control assembly of claim 1 wherein said sensors are Hall effect sensors.

3. The shift control assembly of claim 1 wherein said plurality of sensors include at least three Hall effect sensors.

4. The shift control assembly of claim 1 further including a planetary gear assembly having a reduced speed output engageable by said shift component.

5. The shift control assembly of claim 1 wherein said shift component is a clutch collar.

6. The shift control assembly of claim 1 wherein said gear train includes a plurality of pinion gears and spur gears which reduce speed and increase torque of said drive motor.

7. The shift control assembly of claim 1 wherein said cam surfaces are spaced apart a first distance equal to a second distance separating said cam followers.

8. A transfer case shift control assembly for selecting one of a plurality of operating modes comprising, in combination, an input member, a speed reduction assembly having an output, a clutch member for selectively engaging at least said input member and said speed reduction assembly output, a rotating shift rail having a pair of spaced apart cam followers, a shift fork engaging said clutch member, said shift fork disposed on said shift rail and including a pair of cams, each of said cams engaged by a respective one of said pair of cam followers and directly translating said shift fork in response to rotation of said shift rail, a plate disposed for rotation with said shift rail, said plate defining an array of spaced-apart apertures, a plurality of sensors disposed in sensing relationship with said array of apertures, an electric drive motor having an output, and a gear train driven by said output of said drive motor and directly driving said shift rail.

9. The shift control assembly of claim 8 wherein said plurality of sensors are Hall effect sensors.

10. The shift control assembly of claim 8 wherein said gear train includes a plurality of pinion gears and spur gears which reduce speed and increase torque of said drive motor.

11. The shift control assembly of claim 8 wherein said clutch member includes a circumferential flange and said shift fork defines a channel receiving said flange.

12. The shift control assembly of claim 8 wherein said array of spaced-apart apertures are arranged to provide Gray code data.

13. The shift control assembly of claim 8 wherein corresponding locations on said cams are spaced-apart a distance equal to said distance separating said cam followers.

14. The shift control assembly of claim 8 wherein electric drive motor is controlled by a driven operated switch.

15. A shift control assembly for a power transmission device having at least two operating modes comprising, in combination, an input member, a speed reducing assembly having an output, a clutch member for selectively engaging at least said input member and said output of said speed reducing assembly output, a rotating shift rail having a pair of spaced apart cam followers, a shift fork engaging said clutch member, said shift fork disposed on said shift rail and including a pair of cams, each of said cams engaged by a respective one of said pair of cam followers and directly translating said shift fork in response to rotation of said shift rail, a flat member disposed for rotation with said shift rail, said flat member defining an array of apertures, a plurality of sensors disposed in sensing relationship with said array of apertures, a drive motor having a bi-directional output, and a gear train driven by said output of said drive motor and directly driving said shift rail.

16. The shift control assembly of claim 15 wherein said plurality of sensors include at least three Hall effect sensors.

17. The shift control assembly of claim 15 wherein said speed reducing assembly includes a planetary gear assembly having a reduced speed output engageable by said clutch member.

18. The shift control assembly of claim 15 wherein said gear train includes a plurality of pinion gears and spur gears which reduce speed and increase torque of said drive motor.

19. The shift control assembly of claim 15 wherein said cam surfaces are spaced apart a first distance equal to a second distance separating said cam followers.

20. The shift control assembly of claim 15 wherein said sensors are non-contact sensors.

* * * * *